United States Patent [19]

Potteiger

[11] Patent Number: 4,899,574
[45] Date of Patent: Feb. 13, 1990

[54] METHOD AND APPARATUS FOR DETECTING LEAKS IN A SEALED CONTAINER

[75] Inventor: Thomas M. Potteiger, Mableton, Ga.

[73] Assignee: The Mead Corporation, Dayton, Ohio

[21] Appl. No.: 305,530

[22] Filed: Feb. 1, 1989

[51] Int. Cl.$^4$ ............................................. G01M 3/36
[52] U.S. Cl. .......................................... 73/52; 73/49.3
[58] Field of Search ........................ 73/52, 49.3, 45.4

[56] References Cited

U.S. PATENT DOCUMENTS

| | | | |
|---|---|---|---|
| 2,383,936 | 9/1945 | Hohl | 73/52 X |
| 2,648,977 | 8/1953 | Mills | 73/52 |
| 2,695,515 | 11/1954 | Ward et al. | 73/52 X |
| 4,306,448 | 12/1981 | Rohde | 73/52 |
| 4,315,427 | 2/1982 | Leiter et al. | 73/52 |
| 4,706,494 | 11/1987 | Creed et al. | 73/52 X |
| 4,747,299 | 5/1988 | Fox et al. | 73/52 X |
| 4,771,630 | 9/1988 | Croce et al. | 73/52 X |

FOREIGN PATENT DOCUMENTS 8500797 10/1986 Netherlands ............................ 73/52

Primary Examiner—Michael J. Tokar
Assistant Examiner—Joseph W. Roskos
Attorney, Agent, or Firm—Joel S. Goldman

[57] ABSTRACT

A method is disclosed for testing the integrity of a container of the type which includes a thin walled cup and a flexible lid sealed to the rim of the cup. In accordance with the method a force is applied to an elongated portion of the lid which circumscribes an area which is coaxial with the center of the cup. Since the cup is sealed this application of force causes the circumscribed area to bow outwardly from the cup. The displacement of the bowed portion is then compared to the previously measured displacement for containers known to be of acceptable quality. An apparatus for performing the test has an upper test assembly with a rim which is adapted to be urged against the elongated portion of the lid. A displacement sensor is mounted within the upper test assembly.

19 Claims, 4 Drawing Sheets

METHOD AND APPARATUS FOR DETECTING LEAKS IN A SEALED CONTAINER

BACKGROUND OF THE INVENTION

This invention relates to apparatus and methods for testing the integrity of sealed containers and more particularly containers in which products such as food, may be stored under aseptic conditions.

One type of container which is widely used for aseptic storage of food applications has a bottom portion in the shape of a cup which may be made of a semi-flexible plastic material. After this cup is filled under aseptic conditions (e.g. a temperature of approximately 160°F. in the presence of nitrogen gas) the mouth of the cup is sealed with a flexible lid such as a plastic film or, preferably, a film containing layers of plastic and metallic materials. Typically, a "head space" will be left between the filling material and the lid of the container. This head space may vary from production to production and even within a single production. The range of variance of the amount of head space can be from close to zero volume to quite substantial volumes in proportion to the total volume of the container. Containers such as those described above may be used for packaging liquid materials such as juices or for more viscous materials such as applesauce. Although it is possible for a leak to form in any part of these containers, it is believed that the film material used to form the lid of container is especially vulnerable to the formation of "pinhole" type leaks which are difficult to detect but which can lead to severe contamination of a food product stored within the container. Another part of the container which is especially vulnerable to physically small but biologically significant leaks is the region at the lip of the cup where the lid is bonded to the cup. A defect may be formed in this region, for example, if droplets of moisture are present on the cup lip when it is joined with the lid. The droplets can prevent a complete seal being made and result in the formation of small channels between the lid and the cup lip leading from the inside to the outside of the container. It is to be noted that pinhole-type defects in the lid of the cup and channels in the seal between the lid and the cup may be in the order of 0.001 inches or less in diameter. In order to be effective, a testing method must be sufficiently sensitive to detect defects of this magnitude.

A testing system may be designed to test samples only of the production or to test 100% of production in "in line" or an "off line" manner. For in line testing it is desirable that the test apparatus be capable of detecting a leak in 1.5 seconds or less. This requirement would allow the test apparatus to be incorporated as a station of a present day aseptic packaging system without slowing down the operation of such a system.

There is a degree of conflict between the requirements of speedy testing and the ability to detect small leaks since, small leaks generally require more time to detect by most present testing methods. A number of methods have been proposed to detect leaks in the 0.001 inch (one mil) range. In one such method the entire sealed container is moved into a pressurization chamber and the chamber is pressurized or depressurized to a predetermined value. After a predetermined time during which the pressure is allowed to stabilize, the pressure within the chamber is measured. A variation in the measurement from an expected value is indicative of a leak in the package. A disadvantage of this testing method is that it is relatively slow. Moreover, in order to assure that the proper pressure is applied to the chamber, frequent calibration of the pressurization equipment is necessary.

A number of methods have also been proposed for testing for lid leaks. These methods involve detection of lid deflection using a proximity sensing device. In one such method a vacuum is introduced into a chamber housing the container to be tested. If the lid of the container leaks it will allow a vacuum will be introduced into the interior of the container causing the lid to be pulled downwardly. This movement can be sensed by the proximity sensing device. Utilization of this method requires that there be some void or head space between the contents of the container and the container lid prior to the commencement of the test.

In an alternative method of testing for lid leaks the container is placed in a relatively high pressure chamber. In accordance with this test method, upward movement of the lid indicates a leak. A disadvantage of using this method, is that it is possible that a small pinhole leak may be sealed by the contents of the container (e.g. applesauce) before the lid has moved sufficiently to make the leak detectable.

Yet another method of leak detection which has been proposed is to pressurize only the region where the lid is sealed to the lip of the cup. If there is a leak in this seal the container will be pressurized and upward movement of the lid will occur which can be detected. This method has a number of drawbacks including an inability to detect holes in the main body of the lid; relative slowness of the test; susceptibility to inconsistent measurements caused by variations in temperature or head space; and possible contamination of the contents of the container by air entering it under pressure.

SUMMARY OF THE INVENTION

It is an object of the present invention, therefore, to provide apparatus capable of detecting leaks through holes or channels of 0.001 inches in diameter or less in containers having flexible lids. It is a further object of the invention that such leak detection may be accomplished in 1.5 seconds per container or less.

It is a further object of the invention that the leak detection apparatus should be capable of detecting leaks in containers containing any one of a variety of materials of varying viscosity.

It is yet a further object of the invention to provide a method for testing for leaks in containers which accurately detects leaks in the order of one mil or less in a minimum period of time and which is adaptable to be performed in harsh environments such as those encountered in packaging machinery for aseptic packaging.

The above objects of the invention are achieved by a testing method in which a number of operations are performed on the sealed package to be tested and the displacement of the package lid resulting from these operations is measured and compared with predetermined values. These predetermined values may be obtained by a calibration procedure in which corresponding operations are performed on known good containers which are known to be of acceptable quality and the displacement of the lid resulting from these operations is measured over time. During each of these calibration tests, lid displacement values my be sampled over time and the value of the samples stored in the memory of the computer. After a sufficient number of these calibration readings have been taken, the computer calculates an acceptable range "envelope" for lid displacement having an upper bound of the maximum values of displacement which are allowable for a 'good' sample and a lower bound of the minimum values of lid displacement with respect to time which are acceptable for a leak-free sample. By using these calculated envelopes it is possible to determine with a high degree of confidence whether a test sample is leak-free without waiting for the lid displacement measurement to reach a steady value. This is possible because it has been found that if the lid displacement measurement at a comparatively early time during the test falls within the acceptable value envelope for that time, then it can be predicted that when the lid displacement measurement value stabilizes, the stable value will also fall within the acceptable value envelope.

In accordance with the invention, a test apparatus is provided which includes an upper test assembly adapted to assert a constant force upon the lid of the container to be tested in a region just inside the rim of the cup to be tested. An accurate displacement measuring device is mounted within this upper test assembly. The interior chamber formed when the upper test assembly is in place against the lid is adapted to be airtight and this airtight chamber may be connected to a vacuum source. The lower part of the test apparatus is a cup carrier for holding the cup portion of the container to be tested. This cup carrier also has provisions for applying a vacuum and/or a relatively high pressure to the outside of the cup.

In operation, a bottom edge portion of upper test assembly is moved into position against the lid of the container to be tested with a predetermined force. Since the lid is sealed to the rim of the cup portion of the container action of the upper test assembly causes a "doming" of the portion of the lid which is a circumscribed by the bottom rim of the upper test assembly. In a cup with a relatively major leak, this doming cannot be maintained over time since pressure will be released from the interior of the container through the defect. The change in the position of the lid during the release of pressure can be measured by the displacement measuring device to detect the defect.

In other test modes, a vacuum may be applied to the interior chamber of the upper test assembly, and a vacuum or relatively high pressure can be applied to the outside of the cup via the cup carrier. The relative displacement of the lid caused by these varying conditions over time is measured and compared with the behavior of lids of containers known to be of acceptable quality under similar conditions. If the measured displacement over time of the lid of the container under test over time falls within a previously established time/displacement envelope for acceptable containers, the container under test may be considered to have "passed" its test.

The tests performed in accordance with the present invention are highly accurate because the measurements are performed utilizing a "pressure diaphragm" which is formed by the portion of the lid circumscribed by the bottom edge of the upper test assembly when it is forced against the lid. This pressure diaphragm is isolated from vibrations of the machinery and other causes of inaccuracies of measurement, thereby allowing highly accurate measurements to be taken in minimum periods of time. The ability to detect extremely small defects in relatively short time periods allows these tests to be conducted in-line with the packaging apparatus without causing a slow-down of this apparatus.

BRIEF DESCRIPTION OF THE DRAWINGS

The above and further objects and advantages of the present invention will be apparent to those skilled in the art with reference to the following detailed description in conjunction with the accompanying drawings wherein.

DESCRIPTION OF ILLUSTRATIVE EMBODIMENTS OF THE INVENTION

Figure 1:
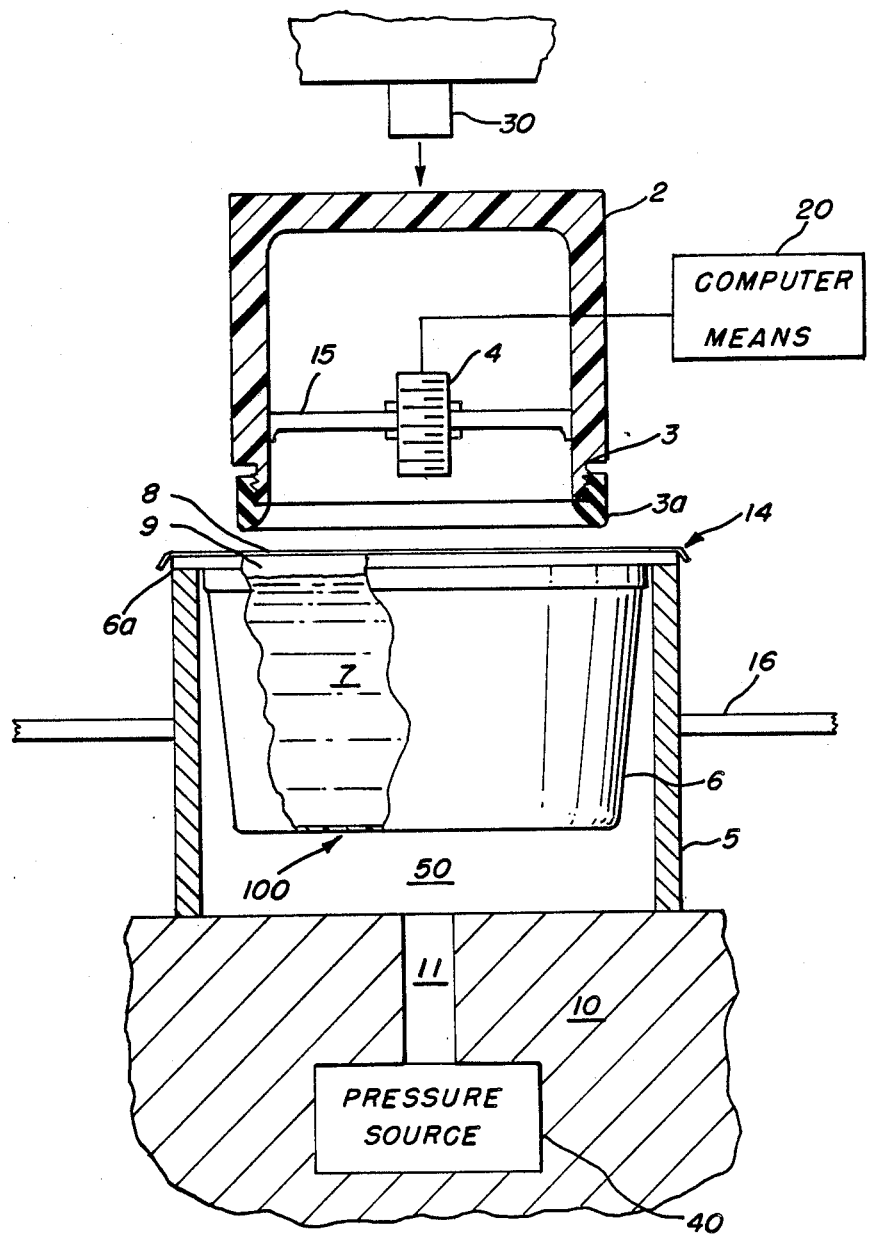
FIG. 1 is a simplified diagram of a test apparatus in accordance with the invention.

FIG. 1 shows a simplified apparatus for testing the integrity by a sealed container 100 which in this case is formed from a cup 6. The lid 8 is made of a flexible material such as plastic is sealed to the cup 6 at the lip 6a portion of the cup in the region 14. The cup 8 is filled with a filler material 7 which is a liquid. After sealing of the container 100 a head space 9 exists within the container 100 between the filler material 7 and the lid 8.

The apparatus has an upper test assembly 2 which may be moved in an upward or downward direction by a force mechanism 30. The bottom part of this upper test assembly 2 has a bottom edge 3 formed by a pressure ring 3a. Ring 3a may be fixedly mounted to assembly 2 but, preferably, it is movable in a vertical direction (e.g. by means of screw threads) so as to provide a means for adjusting the relative distance between its lower most edge and the bottom of a lid sensing device 4 which is also mounted in the assembly 2. Preferably the edge 3 generally follows the contour of the lip 6a forming the opening of the cup portion 6 of the container 100 but it may, for example be circular in shape even if the lip 6a is not. The area of the lid 8 circumscribed by the edge 3 should be centered coaxially with the center of the cup 6 and should be as large as possible for maximizing measurement sensitivity. The pressure ring 3a may be constructed of any rigid or semi-resistent material (e.g. plastic) which is adapted to form a seal against the lid 8 during the performance of the test. The material forming ring 3a should be sufficiently rigid so that ring 3a maintains positional rigidity with respect to the sensor 4 during the performance of testing. Mounted within the upper test assembly 2 by means of mounting means 15 is a lid displacement sensing device 4. This lid displacement sensing device 4 may be any device which is capable of producing highly accurate measurements of movements of the lid 8 of the cup during the performance of the test. In a preferred embodiment an inductive gap sensor has been found to produce measurements of the accuracy required. Such a sensor is produced by the Electro Corporation under the trademark ELECTRO-MIKE ®. It will be appreciated that such an inductive gap sensor may be used only if the lid 8 is metallic or at least partially metallic (e.g. formed of one or more layers of a metallic material interleaved with one or more layers of a non-metallic material). If containers with totally non-metallic lids are to be tested an alternative device for sensing displacement of the lid must be utilized. One such device is a Linearly Variable Displacement Transducer ("LVDT"). Other suitable devices will be apparent to those skilled in the art.

The mounting means 15 may be any convenient rigid means (such as a bracket) for mounting the displacement sensing device 4 to the upper test assembly 2 in a position at which the displacement sensing device 4 will be properly positioned adjacent to the lid 8 of the cup when the test of the container is commenced.

The test assembly 1 also has a cup carrier 5 which holds the cup 6 during testing and which may be the same in which the cup is held during the process of filling it and sealing the lid 8 to it. The cup carrier 5 is adapted to slide along a pressure plate 10 and to stop above a pressurization inlet 11 when it is properly positioned beneath the upper test assembly 2. This pressurizing air inlet is fed by a pressure source 40 which may be a source of either high pressure or of a vacuum.

Figure 2:
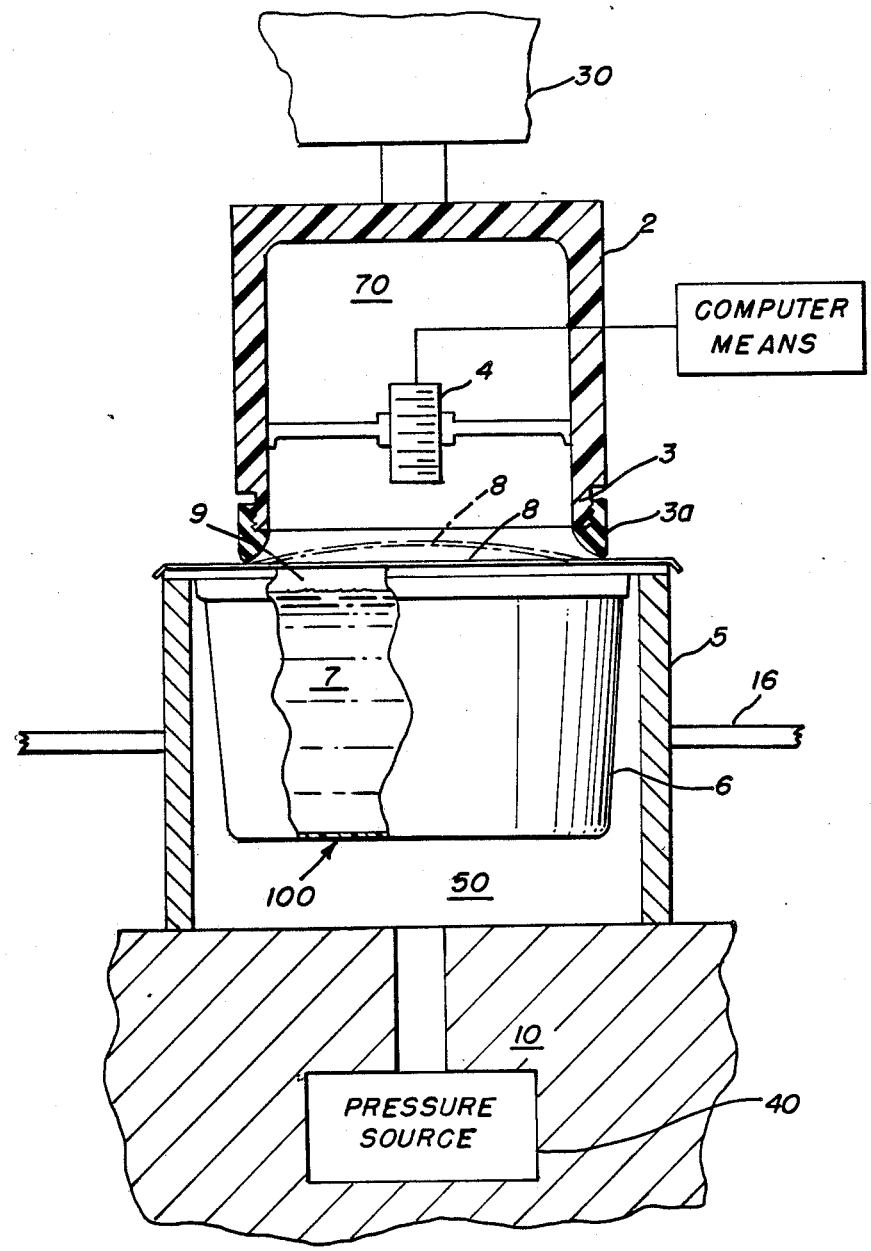
FIG. 2 is a simplified diagram of the test apparatus showing its upper test assembly in place against the lid of the sealed cup under test.

A test of a sealed container 100 utilizing the simplified test apparatus 1 shown in FIG. 1 may be performed as follows. First the upper test assembly 2 is induced to press down on the lid 8 by the force mechanism 30. This force mechanism applies a constant force to the upper test assembly 2 independent of travel. This force is applied to the lid 8 where it is contacted by the lower edge 3 of the upper test assembly 2 via the pressure ring 3a. This forces the portion of the lid 8 in contact with the pressure ring 3a to settle downward as shown in FIG. 2. A center portion of the lid 8 which is circumscribed by the pressure ring 3a settles in front of the lid displacement sensor. 4. At this time a displacement reading is taken from the lid displacement sensor 4 and this displacement value is stored in a memory of the computer means 20. Next, pressure in the range of 5 to 30 psi is applied rapidly to the chamber 50 below the cup 6 from the pressure source 40 via the pressurization inlet 11. This rapid increase in pressure outside the cup 6 causes a corresponding increase in the pressure within the container 100 inducing a further bowing or doming movement of the portion of the lid 8 circumscribed by the pressure ring 3a. The movement of the lid 8 caused by this pressure increase is measured by the lid displacement sensor 4 and readings of the position of the lid 8 at preselected time increments are stored in the memory of the computer means 20.

Figure 4:
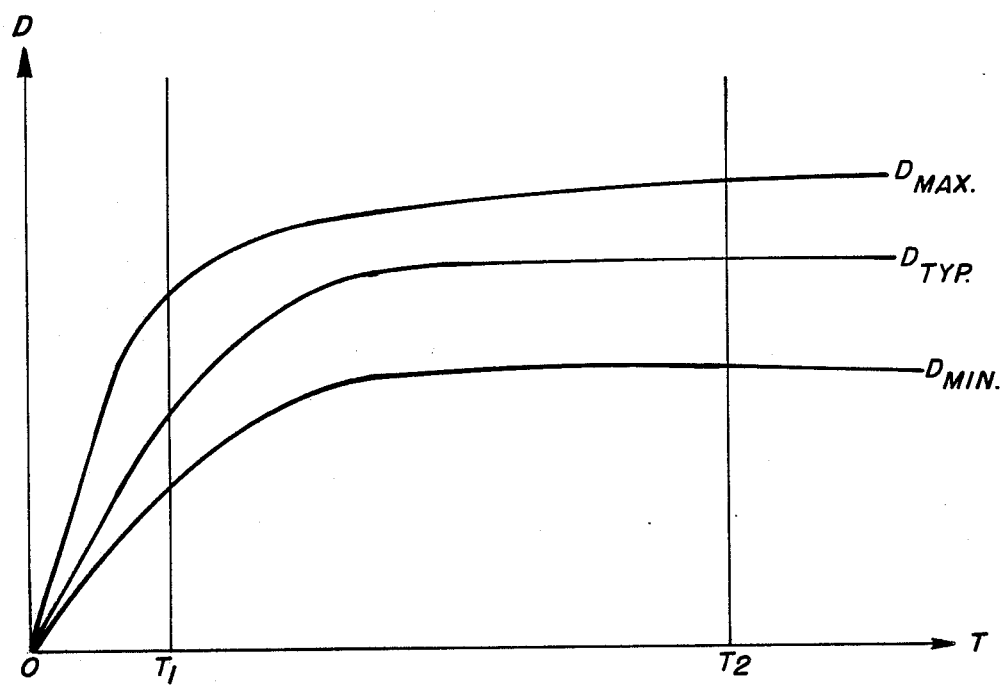
FIG. 4 is a graph of lid displacement versus time illustrating an "envelope" of acceptable values exhibited during testing of samples of sealed cups which are known to be free of defects.

FIG. 4 graphically illustrates these lid displacement readings plotted against elapsed time. The curve of FIG. 4 which typically would result from the above test procedure would have the general appearance of the curve labelled "$D_{TYP}$."

After approximately one second, the pressure in the chamber 50 is released suddenly and the response of the lid 8 to this release of pressure is monitored by the displacement sensor. Samples of the readings of the displacement sensor 4 over time are stored in the memory of the computer means 20.

Figure 5:
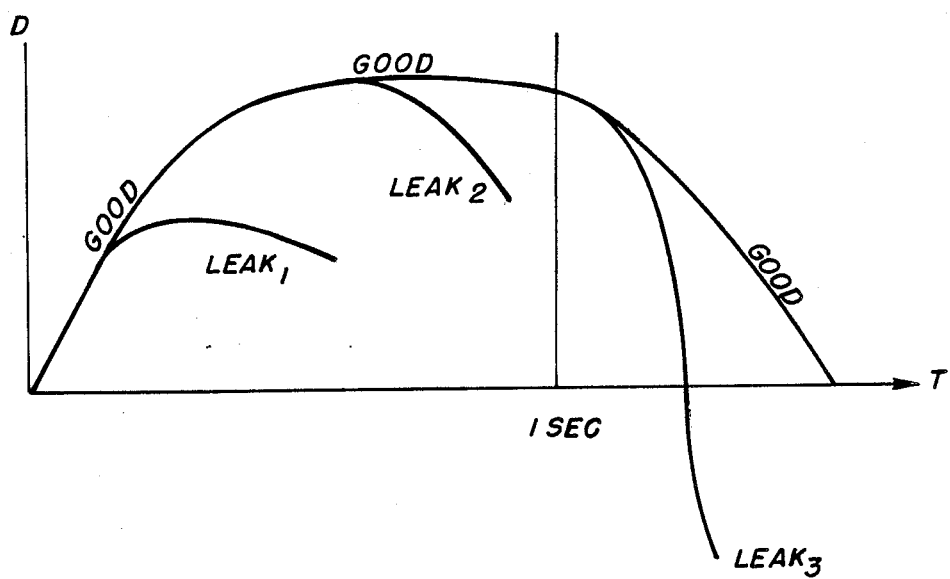
FIG. 5 is a graph of lid displacement versus time which illustrates the behavior during the performance of tests in accordance with the invention of "good" containers and containers with various types of defects.

Referring to FIG. 5 there is shown a graph of displacement of the lid versus time which illustrates the performance of a good lid (the curve labelled "good") and the manner in which three types of defects causing container leakage would show up on such a graph. A first type of defect is one in which the seal between lid 8 to the cup lip 6a blows out when the container 100 is pressurized as a result of pressurization of the chamber 50. In such a situation the lid 8 would begin to dome out toward the displacement sensor 4 and then rapidly begin returning to its original position when the pressure inside the container 100 was released by the blowout. This scenario is illustrated by the curve shown labelled $LEAK_1$ in FIG. 5.

A second type of defective container is one in which there is a slow leak rather than a catastrophic blowout. Such a leak may be caused, for example, by a hole in the lid 8 or in the cup 6 or a slow leak through the seal between the lid 8 and the cup 6a. An example of a displacement versus time characteristic which might be produced by such a slow leak is illustrated by the curve labelled $LEAK_2$ in FIG. 5. It will be noted that the leak 2 displacement characteristic indicates that while the lid 8 can reach its fully domed position, it would tend to settle back from that position over time because of the decrease in pressure inside the container 100 resulting from the leak.

A third mode of failure also caused by a small leak is illustrated by the curve labelled $LEAK_3$ in FIG. 5. In this mode of failure gas is forced out of the head space 9 above the filling material 7 during the pressurization phase of the test. When the pressurization is rapidly released a partial vacuum is created in this head space 9. Consequently, the lid 8, instead of returning to its original position, tends to retreat to a position below the original as shown by the right most portion of the curve labelled $LEAK_3$.

The above described test method has been found to be extremely sensitive for the detection of small leaks in sealed containers. The test method is especially useful for testing containers containing liquids such as apple juice. However, this mode of testing may provide inaccurate results if the container to be tested holds a material containing solids such as applesauce. When such a material comprises the filler 7 within a container 100, pressurization of the chamber 50 may force such solid or semi-solid material into any small leaks in the container, thereby plugging these leaks. The test may, therefore, give a false reading of a good container when in fact a biologically significant leak may exist.

In order to prevent the above problem from occurring, it is desirable to provide an alternative method of testing wherein a vacuum rather than a relatively high pressure is applied to the chamber 50 enclosing the cup and in which a vacuum is also applied to the chamber 70 formed when the upper test assembly 2 is in position against the lid 8. In such a test, for example, if a leak exists in the seal between the lid 8 and the cup lip 6a air will tend to leak into the interior of the container 100 through this leak. This movement of air through the defect causing the defect will tend to keep the free of any plugging material, such as applesauce, which is inside the container 100. It should be noted that this mode of testing is slightly less sensitive to small leaks than is the first test mode discussed above. Thus, a complete test procedure should first determine the type of material filling the container to be tested. If the filling material is a liquid, the first test mode should be used because of its superior sensitivity. If on the other hand a semi-solid material is stored inside the container to be tested, this second test mode should be used.

Figure 3:
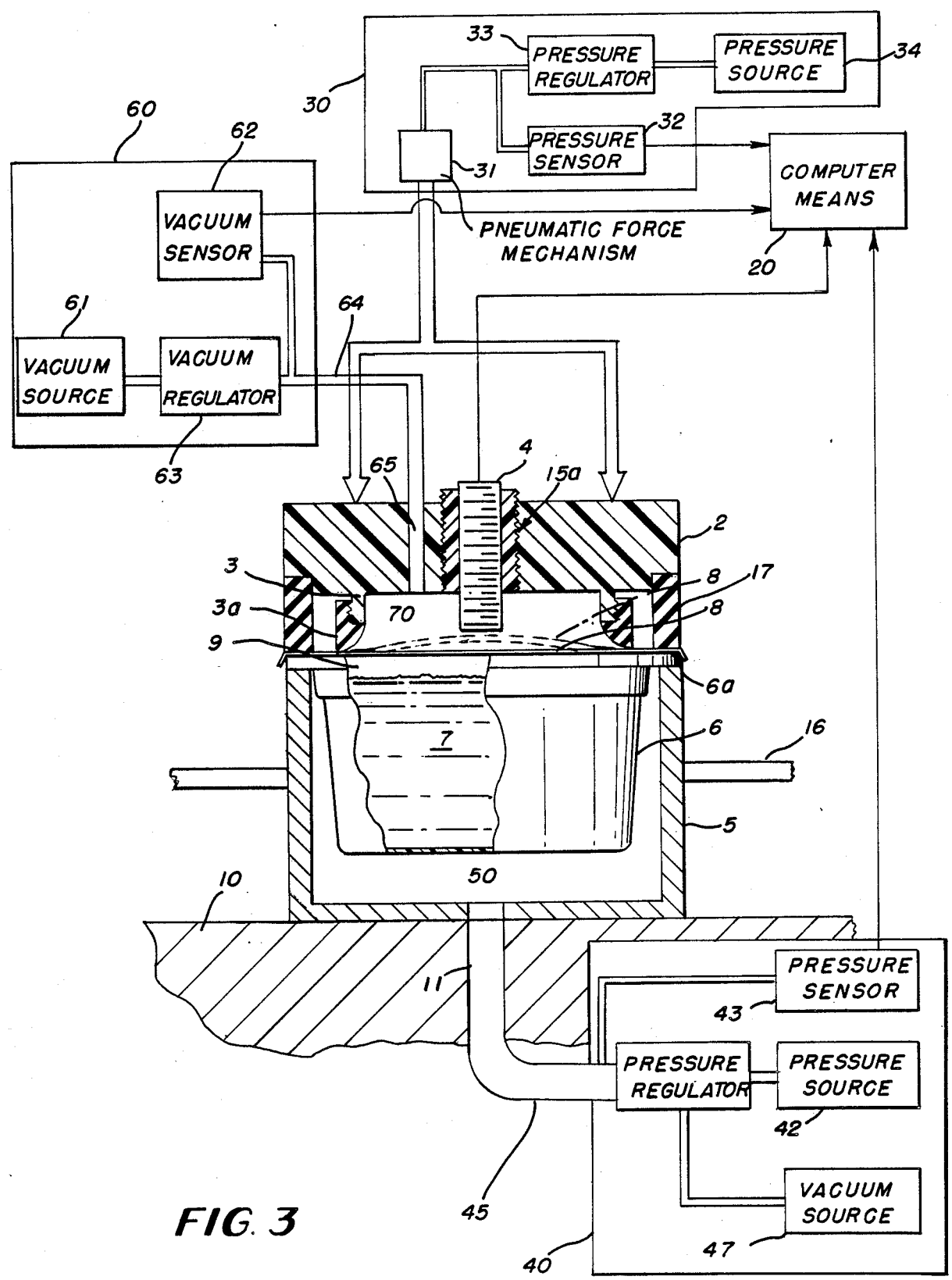
FIG. 3 is a block diagram of a preferred embodiment of the test apparatus of the test apparatus of the test invention.

Referring now to FIG. 3, there is shown a presently preferred embodiment of a testing apparatus which is adapted to perform tests in accordance with either of the test modes discussed above. This apparatus is particularly adapted for testing cups having cup lips 8 which are generally circular or annular in shape. As was the case with the apparatus illustrated by FIG. 1, the preferred embodiment of the apparatus includes a cup carrier 5 which is adapted to slide along a pressure plate 10. The movement of the cup carrier 5 is controlled by a drive apparatus 16 which is part of a container filling and sealing system. In this preferred embodiment the upper test assembly 2 is fabricated of a non-metallic material such as plastic. The lid displacement sensor 4 is an analog proximity sensor such as the ELECTRO-MIKE ® sensor and is installed within the upper test assembly (e.g. with a threaded mounting 15a for fine position adjusted) so that it may be positioned over the center of the cup lid 8 when the cup carrier 5 is properly positioned. It will be noted that this embodiment 15a of the mounting mean for the sensor 4 may also be formed as an integral portion of the upper test assembly 2.

The constant force mechanism 30 which controls the movement of the upper test assembly 2 includes a conventional pneumatic force mechanism 31. Preferably this mechanism is of the short stroke/low friction type having an approximate force range of between 5 to 40 pounds. It is driven by an appropriate pressure source 34 and pressure regulator 33. The pressure applied to the upper test assembly 4 by the force mechanism 31 is measured by a pressure sensor 32 which is connected to a computer means 20 which is capable of reading the output of the pressure sensor 32 under software control.

A vacuum system 60 is connected to the upper test assembly 2 by a vacuum line 64 which feeds a vacuum aperture 65 in the upper test assembly 2. This vacuum aperture 65 opens into the chamber 70 which is formed when the test assembly 2 is in place against the lid 8 during testing. The vacuum system 60 includes a vacuum source 61 (e. g. a vacuum pump) connected to a vacuum regulator 63 which feeds the vacuum line 64. A vacuum sensor 62 is adapted to read the pressure inside the chamber 70. This vacuum sensor 62 is connected to the computer means 20 which is adapted to take readings from the pressure sensor 62 under software control.

A pressurization system 40 is connected to an aperture 11 in the pressure plate 10 by a pressure hose 45. This aperture 11 is situated so as to be in a position to supply a relatively high pressure or a vacuum to the chamber 50 when the cup 6 and cup carrier 5 are in place for testing. The pressure hose 45 is supplied by a pressure system 40 which includes a high pressure source 42, a vacuum source 47, and a pressure regulator which is connected to both the pressure source 42 and the vacuum source 47. A pressure sensor 43 is adapted to read the pressure within the pressure 50 and is connected to the computer means 20. The computer means 20 is adapted to take readings from the pressure sensor 43 under software control. It is to be noted that the pressure regulators 41, 63 and 33 are all connected to the computer means 20 via connections which are not shown. Through these connections, the computer means 20 has the capability, under software control, of adjusting the respective set points of these pressure regulators so as to control the force applied to the upper test assembly 2 by the pneumatic force mechanism 31; to control the vacuum applied to the chamber 70; and to control the vacuum or pressure applied to the chamber 50. The computer means 20 also has the capability of storing all pressure and displacement readings supplied to it by the various sensors in the system and of performing appropriate mathematical and logical operations, under software control, for analyzing these readings and controlling the operation of the vacuum system 60, the force mechanism 30 and the pressurization system 40. A functional description of the software incorporated in the computer means 20 is set forth below in connection with the description of the method of operation of the apparatus illustrated by FIG. 3.

Finally, lower edge 3 of the upper test assembly 2 may incorporate a pressure ring 3a as previously described made of a rigid material such as hard rubber or plastic which is adapted to contact the lid 8 forming an airtight chamber 70 when the upper test assembly 2 is urged downward. Since this rigid pressure ring 3a will not be airtight if, for example, the lid 8 is formed of an embossed material, the upper test assembly may also include a sealing ring 17 made of a soft material such as soft rubber to provide an airtight seal for the chamber 70 when the assembly 2 is lowered into place. The material of the sealing ring 17 should be sufficiently soft so as not to provide any resistance to movement sufficient to impair measurements made by the sensor 4.

As indicated above, the apparatus shown in FIG. 3 is capable of performing tests in two modes. The first mode may be characterized as a "pressure method" and the second mode as a "vacuum method." In the pressure method, the internal pressure in the head space 9 of container 100 under test is increased to force gas in the head space 9 through any leaks in the lid 8, the cup 6, or seal between the lid 8 and the cup 6. In accordance with the vacuum method, the internal pressure in the container under test is decreased to induce air to enter the head space 9 through any leaks in the lid 8, the container 6 or seal between the two. A complete test procedure must take into account the characteristics and limitations of each of the above methods. Prior to actual testing of the container, a decision must be made as to which test method to utilize, depending on the characteristics of the container to be tested and of the contents of these containers.

The overall characteristics and limitations of the pressure method are as follows:

(a) The fill material 7 must be below a predetermined maximum fill line for the size of the container to be tested. This requirement ensures that sufficient head space 9 will exist above the fill material 7 to allow the pressure test to be performed effectively. Insufficient head space can result in undesirably high pressures being produced in the cup which may result in damage to the cup.

(b) The fill material 7 must be a liquid and not contain any solids or particulate matter capable of plugging holes greater than those being tested for.

(c) The lid 8 of the container must be a metallic foil or have a metallic foil layer in combination of other layers such as plastic. This requirement is necessitated by the use of an inductive gap sensor as a lid displacement sensor 4. If another type of displacement sensor, such as an LVDT is used, this requirement of having a layer of metallic foil in the lid 8 may be dispensed with.

(d) The material comprising the cup 6 and the lid 8 must remain constant between tester calibrations. The reason for this requirement will become apparent in connection with the discussion below regarding calibration of the tester.

(e) The test duration will be inversely proportional to the minimum detectable leak rate desired. (This may be selected by the operator.)

The overall characteristics and limitations of the vacuum method are as follows:

(a) The fill material 7 must be above a predetermined minimum fill line for that container size, up to and including zero head space.

(b) There is no restriction as to the type of fill material 7 to be contained in the cup 6. It may be of any viscosity and may contain particulate matter.

(c) The vacuum test will be somewhat less sensitive to small leaks than is the pressure test because of lower pressure differentials generated during this test.

(d) The container must have a foil lid or a lid containing a layer of foil if an inductive gap sensor is utilized as the displacement sensor 4.

(e) The container and lid materials must remain constant between test calibrations.

(f) The duration of the test will be inversely proportional to the minimum detectable leak rate desired.

After the appropriate test mode is selected, a series of cups of known fill levels and of acceptable quality with respect to leaks are run through the apparatus and tested in order to "calibrate" the test apparatus. Each of these containers is tested in a manner in which the computer means 20 varies the test pressures and forces in a manner to determine the maximum and minimum displacement readings which can be expected from the displacement sensor 4 for "good" containers. The readings obtained for each of these containers are compared with readings for the other containers to verify repeatability of the various senor readings. In this manner, the microprocessor "learns" the characteristics of a good container of the type to be tested. This calibration procedure is dependent upon the test mode selected and must be repeated whenever the cup or lid materials are changed or if the fill material 4 or the fill level is changed.

It is to be noted that this process of learning the characteristics of a good container is important in that it allows actual testing to be performed more rapidly than would be otherwise possible. Referring to FIG. 4 there is shown a graph of displacement versus elapsed time for the beginning of a test procedure as "learned" and stored by the computer means 20 during calibration of the apparatus. The upper and lower curves represent the respective maximum and minimum characteristics of displacement versus time as determined by the measurement of containers known to be good. These maximum and minimum characteristics form an "envelope" within which the displacement/time characteristic of a container to be tested should fall in order to be found acceptable. During an actual test, containers whose displacement versus time characteristics fall above or below this envelope will be determined to be defective.

It will be noted that in most previously known test methods relying on displacement of the lid of a container, the displacement versus time characteristic was required to become flat or stable before a measurement could be taken. This restriction was required to ensure accuracy of the measurements. Thus, referring to FIG. 4, utilizing previous test methods, a valid measurement could not be taken or the test completed before the time labelled T2. Utilizing the envelope stored in the memory of the computer means 20 in accordance with the calibration procedure of the present invention, however, it is possible to take valid readings at a time T1, for example, and to determine whether or not a cup is defective based on a substantial deviation from the characteristics of an acceptable envelop at that time. Utilizing this ability to make such measurements before stabilization of the displacement of the cup lid, substantially decreases the time required for performing tests in accordance with the present invention as contrasted with the time required by previous methods.

After selecting the appropriate test mode and calibrating the apparatus testing of containers can begin as set forth below. In the following discussions below all steps, unless otherwise noted, are performed by software which is resident in the computer means 20. The description of the procedures set forth below thus comprise a specification for this software.

Test Procedure - Pressure Method

Step 1. Lower upper test assembly 2 onto the lid 8 of cup to be tested.
 (a) Read pressure sensor 32 and verify that the force applied by upper test assembly 2 to the lid 8
 stabilizes, within a predetermined time limit, to a
 value within the acceptable envelope determined in the
 calibration procedure.
 (b) If pressure stabilizes within the time limit proceed to
 Step 2.
 (c) If pressure does not stabilize within the time limit,
 end the test and generate a failure message ("equipment
 failure").

Step 2. Read lid displacement sensor 4 and verify that lid 8 is present under sensor 4 and is stable within the acceptable envelope as determined in the calibration procedure within the predetermined time limit.
 (a) If the above condition is satisfied, store the
 displacement reading from the displacement sensor 4 in
 memory; store the value reading from pressure sensor 32
 in memory and proceed to Step 3.
 (b) If the above conditions are not met, end the test
 procedure and generate a container fault message ("no
 lid detected or gross leak exceeding test range
 limits").

Step 3. Activate the pressure source 42 and the pressure regulator 41 to apply air pressure greater than ambient to chamber 50. Monitor the reading of pressure sensor 43 to verify that the pressure stabilizes in the acceptable envelope within the time limit set by calibration routine.
 (a) If the pressure in chamber 50 stabilizes within the
 time limit, store the reading from pressure sensor 43
 in the memory of computer means 20 and proceed to Step
 4.
 (b) If pressure in chamber 50 does not stabilize within
 acceptable envelope within predetermined time, end the
 test and generate a test fault message ("gross leak in
 system").

Step 4. Read the lid displacement sensor 4 and verify that lid 8 has moved ("domed") to a position under the sensor 4 in the acceptable envelope under the sensor 4 and is stable indicating that the cup head space 9 is pressurized.

(a) If the above condition is met, store the displacement
reading obtained from the displacement sensor 4 in the
memory of computer means 20 and proceed to Step 5.

(b) If the above condition is not met, the cup is over-filled
or under-filled or the lid has failed. End the
test and generate a fault message ("improper fill level or failure detected").

Step 5. Maintain the pressure in chamber 50 for a period of time preselected by operator based on desired minimum leak rate desired to be detected. Monitor the readings of lid displacement sensor 4 and of the pressure sensor 43 and verify that readings remain within the acceptable envelopes determined by calibration procedure.

(a) If the above conditions are met, proceed to Step 6.

(b) If the above conditions are not met, end the test and
generate a failure message ("container failure").

Step 6. Control the pressure source 42 and the pressure regulator 41 to release the pressure in chamber 50 which was applied in Step 3. Monitor the reading of the pressure sensor 43 and verify that the pressure drops back to an ambient value within the time limit established by calibration procedure.

(a) If the above condition is met proceed to Step 7.

(b) If the above condition is not met end the test and generate a failure message ("test control failure").

Step 7. Read the value of the lid displacement sensor 4 and compare it to the reading taken prior to Step 3 as adjusted, if necessary, by calibration data stored for this type of cup and lid.

(a) If the lid is closer to sensor than is acceptable, the lid has either failed or stretched beyond the limit of its elasticity. Store data and generate the failure message ("container failure").

(b) If the lid position is within the acceptable envelope established in calibration procedure, the container has passed test and does not leak. Store data and generate message ("container passed test").

(c) If the lid 8 is further away from the sensor 4 than is acceptable, the cup has leaked and failed the test. Store the relevant data and generate a message indicating container failure and the relative leak rate value.

Step 8. Position the next cup for testing.

Test Procedure - Vacuum Method

Step 1. Activate the pressure source 34 and the pressure regulator 33 to lower the upper test assembly 2 onto lid 8 of container to be tested.

(a) Monitor the reading of pressure sensor 32 to verify that the force applied stabilizes to a value in the acceptable envelope established during calibration procedure within the preestablished time limit.

(b) If the above condition satisfied, proceed to Step 2.

(c) If the above condition is not satisfied, end the test and generate a message ("test failure").

Step 2. Take a reading from lid displacement sensor 4 and verify that lid 8 is present under sensor in the acceptable envelope established by calibration procedure and becomes stable within this envelope within the predetermined time limit.

(a) If the above conditions are met, store a reading from displacement sensor 4 and a reading taken from pressure sensor 32 in the memory of computer means 20.

(b) If the above conditions are not met, end the test and generate a container fault message ("no lid detected or gross leak exceeding test range limits").

Step 3. Activate the vacuum source 61 and the vacuum regulator 63 to apply a vacuum to the chamber 70, thereby causing the lid 8 to move towards the displacement sensor 4. Monitor the readings from vacuum sensor 62 to verify that vacuum pressure becomes stable within envelope established by calibration procedure within the predetermined time limit.

(a) If the above conditions are met, store a reading from vacuum sensor 62 and proceed to Step 4.

(b) If above conditions are not met, end the test and generate a test control fault message ("vacuum not generated properly"). Step 4. Read the value from lid displacement sensor 4 and verify that lid 8 has moved to an acceptable position under sensor 4 and is stable.

(a) If the above condition is met, store the reading from displacement sensor 4 in computer means 20 and proceed to Step 5.

(b) If above condition is not met, end the test and generate a fault message ("cup underfilled or hole detected in lid or lid failure").

Step 5. Activate the vacuum source 47 and the pressure regulator 41 to apply vacuum pressure less than ambient to chamber 50 thereby reducing the pressure in the head space 9 of the cup under test. Monitor the reading of pressure sensor 43 to verify that the pressure in chamber 50 becomes stable within the acceptable envelope established by calibration procedure within the predetermined time limit.

(a) If the above condition is met, store the reading from pressure sensor 43 in memory of computer means 20 and proceed to Step 6.

(b) If the above condition is not met, end the test and generate a message ("test control fault").

Step 6. Take a reading from the lid displacement sensor 4 and verify that the lid has moved to a position within the acceptable envelope established by calibration routine.

(a) If the above condition is met, store the reading from lid displacement sensor 4 in memory of computer means 20 and proceed to Step 7.

(b) If the above condition is not met, end the test and generate one of the appropriate messages set forth below:

(1) If the lid has not moved enough, generate the message "fill level in container unacceptably low."

(2) If the lid has moved too much generate the message "container failed."

Step 7. Maintain the vacuum in chamber 50 as established in Step 5 for a duration of time appropriate to the desired sensitivity of the test. Monitor the reading of the displacement sensor 4 during period in which vacuum pressure in chamber 50 is held stable.

(a) If lid 8 moves toward sensor 4 more than the movement which has been established as acceptable during the calibration routine, there is a container leak in the ambient pressure area (the region 14 in the vicinity of the seal between the lid 8 and the lip 6a of the cup 6. Store data and generate message "seal failure" indicating relative leak rate value.

(b) If lid 8 remains within the acceptable envelope of movement as established in the calibration routine, the cup 6 and the lid 8 are leak-free. Tabulate the data and generate message "cup passed."

(c) If the lid 8 moves in a direction away from the sensor 4 for a distance greater than that established as acceptable during the calibration routine, there is a leak in the container in the region of chamber 50 and/or the chamber 70. Tabulate the data and generate a message indicating "container failure."

Step 8. End of test, move next cup into position to test.

While a preferred form of practicing the present invention and a preferred embodiment of a test apparatus adapted for performing the inventive method have been illustrated and described, and several modifications have been discussed, persons skilled in the art will readily appreciate that various additional modifications both to the method of performing the tests and to the preferred apparatus for performing them may be made without departing from the spirit of the invention as, as defined by the following claims.

I claim:

1. The method of testing the integrity of a container comprising a thin walled cup having a rim portion defining a mouth thereof and a flexible lid sealed to said rim portion, said container enclosing a volume of filler material and a volume of head space, said method comprising the steps of:
   applying a force to an elongated edge portion of the lid which circumscribes a central portion of the lid which is coaxial with the center of the cup thereby causing said lid to bow outwardly from the cup;
   measuring the position of the bowed portion of the lid by means which apply no substantial force to said bowed portion;
   comparing the position of the lid with a first predetermined acceptable position value.

2. The method of claim 1 further comprising the steps of:
   applying a uniform predetermined pressure to the outside of the cup;
   measuring any displacement of the lid occurring during the previous step; and
   comparing the displacement measured in the previous step to a predetermined acceptable displacement value.

3. The method of claim 2 further comprising the steps of:
   maintaining the uniform pressure applied to the cup for a predetermined time period;
   periodically measuring the displacement of the lid during such predetermined time period; and
   determining whether the displacement of the lid remains within a predetermined acceptable range of values during said time period.

4. The method of claim 3 further comprising:
   releasing the pressure applied to the cup;
   measuring the position of the lid; step to a position of the lid measured immediately before the pressure applying step; and
   comparing the difference in positions of the lid determined in the previous step to a predetermined acceptable positional difference.

5. The method of claim 1 further comprising:
   applying a vacuum pressure to the central portion of the lid;
   measuring any displacement of the central portion occurring during the previous step; and
   comparing the displacement measured in the previous step o a second predetermined acceptable displacement value.

6. The method of claim 5 further comprising the steps of:
   storing the displacement value of the central portion determined in said measuring step.

7. The method of claim 6 further comprising:
   applying a vacuum pressure to the outside of the cup;
   measuring the displacement of the lid occurring the vacuum applying step; and
   comparing the displacement measured in the previous step with a predetermined range of acceptable displacement values.

8. The method of claim 7 further comprising:
   maintaining the vacuum pressure applied to the central portion of the lid and to the cup for a predetermined period of time;
   periodically measuring the displacement of the lid occurring during the predetermined time period; and
   comparing the displacement values measured in the previous step to a predetermined range of acceptable displacement values.

9. Apparatus for testing the integrity of a container of a type comprising a thin-walled cup having a rim portion defining a mouth of the cup and a flexible lid sealed to the rim portion, which container is adapted for enclosing a volume of filler material and a volume of head space, said apparatus comprising:
   means for holding the container in an upright position during testing;
   an upper test assembly including, a pressure edge adapted for contacting the lid of the cup and circumscribing a central portion of the lid coaxial with the cup and inside the rim portion, and a displacement measuring transducer mounted in said upper test assembly and adapted for measuring changes in position of the cup lid without applying any substantial force to the cup lid;
   a force generator operatively connected to said test assembly for urging it against the cup lid; and
   computer means connected to the measuring means for comparing the displacement of the cup lid when the upper test assembly is urged against it by said force means with a predetermined acceptable displacement value.

10. The apparatus of claim 9 in which said displacement measuring transducer is mounted in said upper test assembly in a position such that it will be adjacent said center portion of the cup lid which the upper test assembly is in place against the cup lid.

11. The apparatus according to claim 9 wherein said displacement measurement transducer comprises an inductive gap sensor.

12. The apparatus of claim 9 wherein said displacement measuring transducer comprises a linearly variable displacement transducer.

13. Apparatus according to claim 9 wherein said pressure edge comprises a ring of non-metallic material mounted in said upper test assembly.

14. Apparatus according to claim 13 further including means for adjusting the distance between a portion of said pressure ring which contacts the cup lid when said force generator is activated.

15. Apparatus in accordance with claim 14 wherein said pressure ring is screwably mounted in said upper test assembly for providing said distance adjusting means.

16. Apparatus in accordance with claim 9 wherein said container holding means comprises a chamber adapted for enclosing the cup during testing; and
wherein said apparatus further comprises means for pressurizing said chamber.

17. Apparatus in accordance with claim 9 wherein said computer means further comprises means for comparing the position of the lid when said chamber is pressurized with a second predetermined acceptable displacement value.

18. Apparatus in accordance with claim 9 wherein said upper test assembly further comprises a chamber opening to the area circumscribed by the pressure edge; and
means for applying a vacuum to said upper test assembly chamber when said pressure edge is in contact with said cup lid.

19. Apparatus in accordance with claim 18 wherein said computer means further comprises means for comparing the reading of said displacement sensor when vacuum is applied to said upper test assembly chamber with a third predetermined displacement value.

* * * * *